(12) United States Patent
Godot

(10) Patent No.: US 11,487,135 B2
(45) Date of Patent: Nov. 1, 2022

(54) LENS SUPPLY SYSTEM AND RELATED METHODS

(71) Applicant: Essilor International, Charenton le Pont (FR)

(72) Inventor: Vincent Godot, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 201 days.

(21) Appl. No.: 16/735,487

(22) Filed: Jan. 6, 2020

(65) Prior Publication Data

US 2020/0142216 A1    May 7, 2020

Related U.S. Application Data

(62) Division of application No. 14/903,795, filed as application No. PCT/EP2014/064759 on Jul. 9, 2014, now Pat. No. 10,558,060.

(30) Foreign Application Priority Data

Jul. 10, 2013 (EP) .................................... 13305983

(51) Int. Cl.
   *G02C 7/02*   (2006.01)
   *B29D 11/00*  (2006.01)
   *B24B 13/005* (2006.01)
   *G02C 13/00*  (2006.01)
   *G06Q 30/06*  (2012.01)

(52) U.S. Cl.
   CPC .......... *G02C 7/021* (2013.01); *B24B 13/0055* (2013.01); *B29D 11/00317* (2013.01); *B29D 11/00961* (2013.01); *G02C 7/024* (2013.01); *G02C 13/003* (2013.01); *G06Q 30/0601* (2013.01); *G02C 2202/08* (2013.01)

(58) Field of Classification Search
   CPC ...... G02C 7/021; G02C 7/024; G02C 13/003; G02C 2202/08; B24B 13/0055; B29D 11/00317; B29D 11/00961; G06Q 30/0601
   USPC ..................................................... 351/159.69
   See application file for complete search history.

(56) References Cited

U.S. PATENT DOCUMENTS

| 2009/0204250 | A1 | 8/2009 | Potyrailo et al. |
| 2009/0302122 | A1 | 12/2009 | Begon |
| 2010/0283965 | A1* | 11/2010 | Dubois ............ B29D 11/00009 351/159.76 |
| 2010/0283966 | A1 | 11/2010 | Colas et al. |
| 2010/0321049 | A1 | 12/2010 | Fornara et al. |
| 2012/0314186 | A1 | 12/2012 | Levraud et al. |

(Continued)

FOREIGN PATENT DOCUMENTS

| CN | 101073040 A | 11/2007 |
| CN | 101930968 A | 12/2010 |

(Continued)

OTHER PUBLICATIONS

International Search Report, dated Oct. 20, 2014, from corresponding PCT application No. PCT/EP2014/064759. Cited in parent application.

*Primary Examiner* — Marin Pichler
*Assistant Examiner* — Mitchell T Oestreich
(74) *Attorney, Agent, or Firm* — Nixon & Vanderhye

(57) ABSTRACT

The supply systems for providing spectacle ophthalmic lenses have improved efficacy, in particular with respect to lens blank picking performance and/or lens manufacturing performance.

2 Claims, 1 Drawing Sheet

(56) References Cited

U.S. PATENT DOCUMENTS

2013/0000499 A1    1/2013   Ookubo et al.
2014/0300856 A1   10/2014   Dangelmaier et al.
2014/0364039 A1   12/2014   Eurin

FOREIGN PATENT DOCUMENTS

| CN | 102893204 A | 1/2013 |
| DE | 10 2011 089 704 A1 | 6/2013 |
| EP | 2 028 527 A1 | 2/2009 |
| EP | 2 264 759 A2 | 12/2010 |
| FR | 2 879 313 A1 | 6/2006 |
| FR | 2 959 831 A1 | 11/2011 |
| WO | 2013-087504 A1 | 6/2013 |

\* cited by examiner

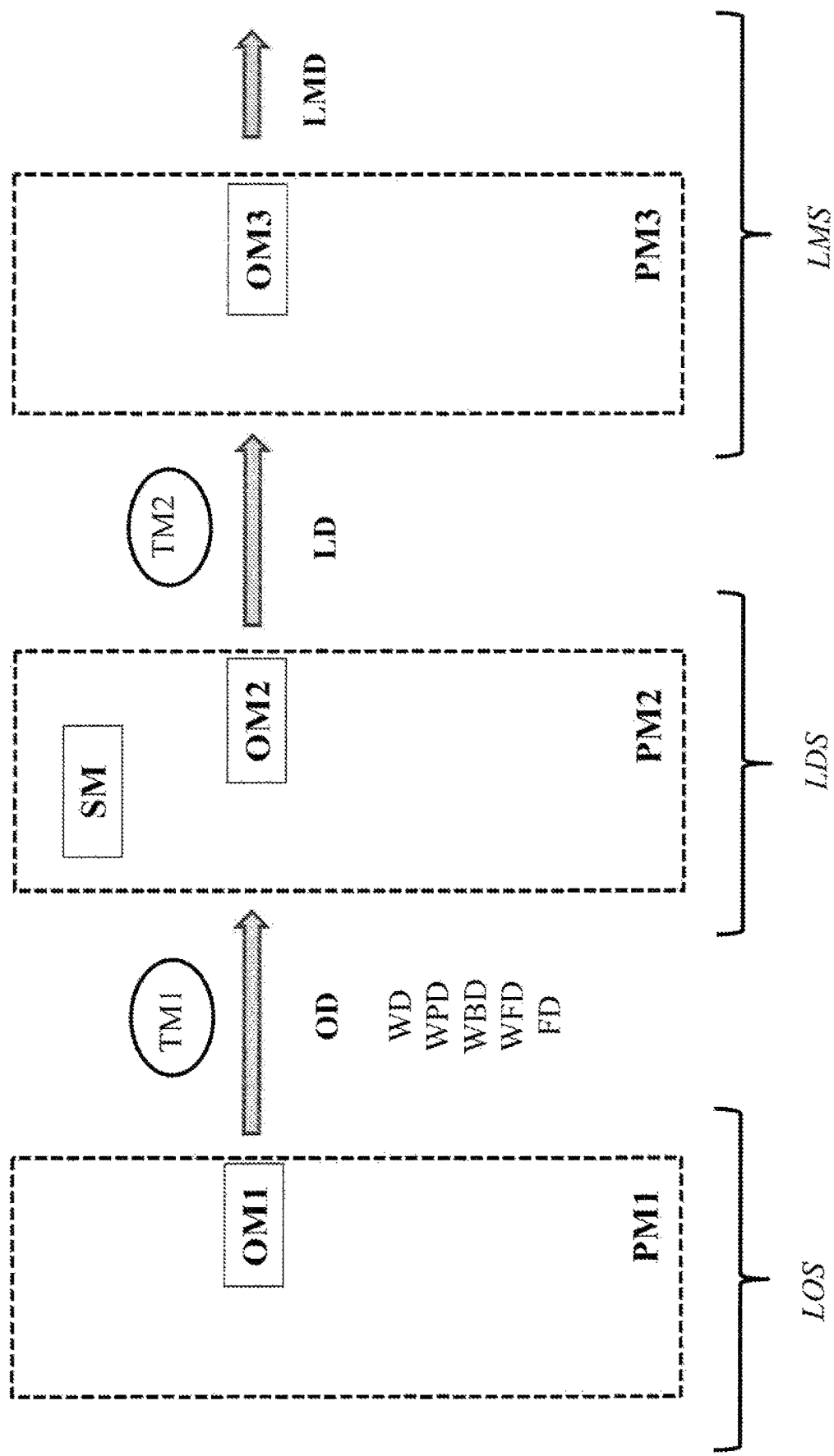

LENS SUPPLY SYSTEM AND RELATED METHODS

FIELD OF THE INVENTION

The invention relates to an ophthalmic lens supply system and related methods.

BACKGROUND OF THE INVENTION

Spectacle ophthalmic lenses may be provided according to various methods. Some methods known in the art involve providing a lens blank, namely a lens having a finished surface on one side (generally the front side) and an unfinished surface on the other side; machining the unfinished surface so as to have both surfaces finished. When operating according to such methods, a number of lens blank references are made available for selection (picking) so as to possibly meet the requirements for most spectacle wearer situations.

This however requires supply management. Indeed, blanks typically have an expiration date. Further, typically, tens of thousands of different blank references, or even more, may be available for selection. Supply systems and methods are required to optimize efficacy and accuracy.

SUMMARY OF THE INVENTION

The present invention relates to supply systems for providing spectacle ophthalmic lenses. Said supply systems have improved efficacy, in particular with respect to lens blank picking performance and/or lens manufacturing performance.

The present invention also provides a lens blank with an identifier, wherein the identifier allows the subsequent retrieval of a measured value of a geometrical parameter of said blank.

The present invention further provides methods for providing a lens blank that is identifiable, in that it allows the subsequent retrieval of a measured value of a geometrical parameter of said blank; methods for picking a lens blank; and methods for making a finished lens.

The present invention lies particularly in that at least a measured value of at least one geometric parameter of a semi-finished spectacle lens blank is used instead of the corresponding nominal value of said at least one geometric parameter.

BRIEF DESCRIPTION OF THE DRAWING

FIG. 1 shows a schematic representation of a lens supply system according to the invention.

DEFINITIONS

The following definitions are provided to describe the present invention.

"Ophthalmic lenses" are known in the art. According to the invention, the ophthalmic lens may be selected from progressive lenses; unifocal, bifocal, trifocal or more generally multifocal lenses; single-vision lenses. The lenses are for use in spectacles (eyeglasses). A lens may be finished (cut or uncut) or unfinished (for example, semi-finished).

"Semi-finished lens blanks" (or semi-finished blanks) are known in the art. A semi-finished blank is a lens having two surfaces, one of which being finished (generally the front surface), while the other surface (generally the back surface) being unfinished. The semi-finished blank is intended for machining, typically by surfacing and polishing, so as to have both surfaces finished, thus resulting in a finished lens. Methods for obtaining semi-finished blanks are known in the art, and generally may comprise a casting step or a surface machining step. For a given semi-finished blank manufacturer, each semi-finished blank reference has a manufacturing specification. Said specification includes a number of parameters and nominal values for each of said parameters. Said parameters include geometrical parameters and non-geometrical parameters. Such parameters are well known in the art. Methods for measuring same are also known in the art and for example can be implemented during quality control. For example, physical methods or optical methods are known. Surface measurements can be performed with a lens mapper. According to the present invention, said parameters may be those described in the Vision Council Lens Description Standard (version 2.0, updated 26 Oct. 2011), the contents of which are incorporated herein by reference. Preferably according to the invention, said semi-finished blank is mass-produced or mass-producible.

"Geometrical parameters" of a lens are known in the art. According to the present invention, said parameters may be those described in the Vision Council Lens Description Standard (version 2.0, updated 26 Oct. 2011).

Preferably, said geometrical parameter is selected from:

front or back or lenticular curve radius; said curve radius may be defined for at least one given point of the surface, over the entire surface, or over a portion of the surface; said curve radius may be a minimum or maximum or mean value; said minimum, maximum or mean value may be defined in an absolute or local manner, e.g. an absolute (respectively, local) minimum, maximum or mean value is defined over the entire surface (respectively, over a portion of the surface); when the curve radius is defined at one given point, said point may be selected from the reference points disclosed therein, including fitting cross (FC), layout reference point (LRP), prism reference point (PRP), distance reference point (DRP), near reference point (NRP);

front surface sag height; said sag height may be defined for at least one point of the surface; the (absolute or local) minimum or maximum or mean value thereof;

center or edge thickness; diameter such as maximum diameter of blank, diagonal diameter, minimum vertical diameter, minimum horizontal diameter;

location and/or orientation of the polarization film within the semi-finished lens blank if any; the location refers to the local, minimum, maximum or mean distance between the front surface of the semi-finished lens and the polarization film; indeed, lenses tend to be thinner and thinner, and the exact position of the polarization film within the bulk of the lens may impact surfacing options for the back surface of the lens; further, variation in the distance between the front surface and the polarization films may induce prisms;

parameters indicating the location of a reference point selected from fitting cross (FC), layout reference point (LRP), prism reference point (PRP), distance reference point (DRP), near reference point (NRP);

and deviations of any one of the above with respect to the corresponding nominal values from said manufacturing specification;

Reference points are known in the art. The parameters indicating the location of a reference point may be used to indicate its horizontal or vertical location. For example, the following parameters may be used to indicate the location of the following reference points, as described in the above quoted Vision Council Standard and with corresponding guidelines therein:

LRP: parameters LRP In, LRP Down,
PRP: parameters PRP Out, PRP Up,
DRP: parameters DRP In, DRP Up,
NRP: parameters NRP In, NRP Up.

Where the lens is a progressive spectacle lens, reference point location may be defined with respect to a permanent micro-marking system of coordinates. Alternatively, locations may be expressed with respect to other suitable coordinate systems based upon a 'mechanical' or 'geometrical' point or an 'optical' point, e.g. geometrical centre of the lens. For example, where the lens is a single vision spectacle lens, LRP shall be assumed to be coincident with the geometric centre of the blank.

Further, the skilled person knows other ways to define geometrical parameters through surface definition, for example by using methods such as that of splines, nurbs or Zernike polynomials.

"Non-geometrical parameters" of a lens are known in the art. According to the present invention, said parameters may be those described in the Vision Council Lens Description Standard (version 2.0, updated 26 Oct. 2011). Examples include left eye/right eye, identification of the substrate, refractive index of the material, presence and description of coatings such as hard-coat, hard multi-coat (anti-shock, anti-fog, anti-scratch, anti-reflection), colour, polarization, filter, expiration date and the like.

"Picking", when referring to semi-finished blanks, is known in the art. It designates a step or a process for selecting a semi-finished blank from a plurality of blanks. Picking is generally performed by taking into account the order from the eye specialist (order data, OD) and in particular the prescription data or, if the lens is to be designed through optical optimization, the target optical function. "Target optical function of an ophthalmic lens" represents the global optical performance to be reached for said lens, i.e. the set of characteristics the ophthalmic lens should have in wearing conditions. Picking amounts to selecting a blank suitable for making a finished lens that would ideally allow to physically reach the target optical function.

"Prescription data" are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye.

"Wearer data" (WD) designates one or more data obtained on the wearer. Wearer data generally comprise "wearer prescription data" (WPD) and/or "wearer biometry data" (WBD). Prescription data are defined above. Wearer biometry data include data pertaining to the morphology of the wearer, and typically include one or more of monocular pupillary distance, inter-pupillary distance, axial length of the eye, position of the center of rotation of the eye (CRE). Wearer data may also comprise "wearer frame data" (WFD), which are data linked to the frame worn by the wearer such as pantoscopic angle, wrap angle or vertex distance. Wearer data may also include behavior data such as head/eye gain, or posture data such as CAPE angle. The wearer data are generally provided for each eye, but may also comprise binocular biometry data.

"Frame data" (FD) refers to a set of one or more data characterizing an eyeglasses frame. Said data may comprise one or more of dimensions of the lens to be fitted (length and height), inner rim shape of the frame for intended fitting of the lenses, distance between lenses (DBL), convexity of the frame, tilt angle of the frame rims, etc. Frame data may also extend to further information such as type of lens design, lens material and index thereof, presence and selection of a filter, selection of one or more possible coatings on the lenses, etc.). Frame data may be obtained through physical measurements on an actual frame, for example using a frame reader. Frame data may also consist in a reference from a catalogue or from a set (range) of predetermined frames.

"Order data" (OD) are spectacle ophthalmic lens order data. Such data are known in the art and may comprise wearer data, including wearer prescription data, wearer biometry data and wearer frame data. Order data may also comprise an indication of the additional level of quality required (extra level of quality requirement for compliance with the desired optical properties).

"Lens data" (LD) refers to a set of one or more data characterizing an ophthalmic lens. Said data comprise data defining one or more geometrical (surface) characteristics and/or one or more optical characteristics of the lens, such as the refractive index of the lens material. Lens data can be in the form of an electronic file, for example a surface file. Said surface file may correspond to the finished back surface of a lens to be manufactured, for example wherein the lens is obtainable by machining the back surface of a semi-finished blank. Said surface file may alternatively correspond to the front surface of a lens to be manufactured. Said lens data may also comprise two surface files, one for each the front and the rear surface, their relative positions and the refractive index of the lens material.

"Surface data" are lens surface data such as a lens file, containing for example back surface data for the finished lens, including back surface positioning data i.e. data for positioning the back surface with respect to the front surface; front surface data, etc.; or any identifier that allows to retrieve said surface data. Determination of relative positioning of front and back surfaces, and possible corresponding positioning errors, can be performed as in WO 2013/087504.

"Lens blank data" are lens data for a semi-finished lens blank, or any identifier that allows to retrieve same.

"Lens manufacturing data" (LMD) are data useful for lens manufacturing, and may comprise one or more of designation of the type of equipment to be used for machining, including designation of type of blocking machine, type of surfacing machine, type of polishing machine, etc.; selection of settings and/or protocol parameters to be used by each of said machining equipment, for example protocols for blocking the lens, for surfacing the lens, for polishing the surfaced surface of the lens, etc.

The skilled person is familiar with the above types of data, and also with ways of transmitting, coding and retrieving such data. For example, data communication standards have been issued by the Vision Council.

"Measured value" of a geometrical parameters means a value obtained after measurement of the geometrical parameter effectively and physically carried out on the corresponding semi-finished spectacle lens blank. The measured value and the nominal value are two different pieces of information although they can be numerically identical. The nominal value of a geometrical parameter might be defined or described as a parameter that is measured at a particular location on the semi-finished spectacle lens blank like in EP 2 028 527. However, this does not mean that effective and physical measurement was carried out for this geometrical parameter and for the spectacle lens blanks. This merely means that the nominal value is a value that one should expect at that particular location on the semi-finished spectacle lens blank plus or minus the acceptable margin of error. Indeed, semi-finished spectacle lens blanks are produced according to manufacturing specifications giving at least a nominal value for at least a geometrical parameter with manufacturing margin of error. The semi-finished lens blanks is then marked with or identified as corresponding to the at least a nominal value for the at least a geometrical parameter. Thus, it is easily understood that the nominal value can be different from the effected value obtained if one measures the geometrical parameter at the corresponding location on the semi-finished spectacle lens blank. On the contrary, a "measured value" of the same geometrical parameter, as should be understood within the scope of the present invention, is necessarily obtained only after the semi-finished spectacle lens blanks are produced. The measurement is carried out effectively for each semi-finished spectacle lens blank that is then marked with or identified as having the measured value. Thus, semi-finished spectacle lens blanks marked with or identified as corresponding to a given nominal value, may be marked with or identified as having different measured values.

DETAILED DESCRIPTION OF THE INVENTION

Supply Systems

The present invention pertains to ophthalmic spectacle lens supply systems for providing an ophthalmic spectacle lens. The supply systems of the invention are schematically represented on FIG. 1.

In one embodiment, the invention provides a lens supply which allows improved picking. According to the invention, the lens supply system comprises:

second processing means (PM2) at a lens determination side (LOS), suitable for providing lens data (LO) of a lens blank selected from a plurality of semi-finished spectacle lens blanks based upon order data (OO), wherein said second processing means (PM2) comprise:

selecting means (SM) suitable for selecting a lens blank from the plurality of semi-finished spectacle lens blanks based upon the measured value of at least one geometrical parameter of said lens blank, each semi-finished spectacle lens blank having an identifier allowing retrieval of the measured value of the geometrical parameter and outputting means (OM2) suitable for outputting said lens data (LD), wherein said lens data (LD) comprise lens blank data and surface data.

Said lens data (LD) may comprise an identifier that allows for a selection by said selecting means (SM). Said identifier is preferably a graphic identifier and may include coded data and take a form selected from bar codes, including 1D codes, 2D codes (Datamatrix, QR codes, Flashcodes, Aztec, etc.), 3D codes, etc; wireless codes such as RFID or NFC; encryption keys. Said identifier may take a graphic form and may be provided either on the lens blank surface or within the lens blank bulk. This may be obtained by means known in the art, such as stamping, printing, engraving, for example by use of a Femto laser, as described in EP13305240.7 filed on 1 Mar. 2013.

In the event where the lens blank is provided in a packaging, said identifier may be provided on said packaging, by means also known in the art, such as by using a label, a stamp, or by print (inkjet, etc.).

Said surface data may also be an identifier as described above.

According to the invention, the selecting means (SM) are suitable for selecting a lens blank from a plurality of semi-finished spectacle lens blanks based upon the measured value of at least one geometrical parameter of said lens blank. Accordingly, the picking is not performed according to the nominal values of the parameters as set forth in the manufacturing specifications of the available blanks, but rather is based upon actual measured values thereof. This advantageously provides for higher accuracy in the process. The selecting means is advantageously suitable for retrieving the measured value of the geometrical parameter the corresponding lens blank, and for comparing the measured values of the geometrical parameter of the lens blanks with a desired value for said geometrical parameter. The selecting means may comprise pre-screening means that proceed for a selection of a sub-set of blanks candidates based upon nominal values from the specifications and sub-selecting means that proceed based upon actual measured value among the pre-screened candidates. Alternatively, the selecting means may be suitable for a direct selection from a global pool of non-pre-screened blank candidates. In such situation, advantageously, the system of the invention allows for the picking of a blank that would not have been selected from a pool of blanks due to its nominal value not matching, but whose actual measured value does match for a given parameter. Such supply system is very advantageous in that it allows to make use of blanks which may not have been used otherwise, possibly for poor compliance with the specification. Further, semi-finished lens blanks are generally subjected to quality control to ensure that they meet their specification within given tolerance values. According to the invention, it is possible to make use of blanks which are non-compliant with the required tolerance values (e.g. according to ISO tolerance standards). This may be achieved through recycling, wherein a non-compliant semi-finished lens blank is not discarded, but rather re-injected into a pool of blanks and nevertheless used based on the (known) measured values of its parameters. This advantageously allows to decrease wastes, increase production yields and decrease costs. This form of recycling allows to artificially increase tolerance, since a semi-finished lens blank, considered as non-compliant for a given specification, may nevertheless be used and picked from a pool.

This supply system thus provides for improved management of blank supplies.

The supply system may further comprise:

processing means (PMA) at a lens ordering side (LOS), suitable for placing an order of an ophthalmic lens and comprising outputting means (OM1) suitable for outputting the order data (OD); and order data transmission means (TM1) suitable for transmitting said order data (OD) from said first processing means (PM1) to said second processing means (PM2).

Said processing means (PM1) at the lens ordering side (LOS) are means suitable for the input of the relevant data. The person skilled in the art is familiar with such suitable means. Said first processing means may include inputting means, preferably selected for facilitated interface (e.g. may be used in connection with displaying means), and may be a keyboard from a computer such as a PC or laptop, tablet, handset, terminal, remote, etc.

Said lens ordering side (LOS) is typically at the premises of an eye care professional or optician where lenses are ordered for wearers (customers).

The invention may further provide a lens supply which has improved manufacturing efficacy. The increase in efficacy results from the fact that the finished lens design and/or manufacturing take(s) into account at least one actual measured value of a lens blank geometrical parameter, resulting in improved accuracy for lens design and/or manufacture, and hence improved wearer comfort. Further, manufacturing efficiency may be further improved by taking into account non-geometrical parameters, such as expiration dates or position of a polarization film. Thus, for example manufacturing efficiency may be improved in the event where the location of the polarization film is not compliant with the specification and the intended back surface machining would damage the film, resulting in an unusable lens that cannot be delivered to the eye specialist. Instead, according to the invention, another blank may be picked, to ensure feasibility of the back surface machining without damaging the polarization film, based on its exact location within the bulk of the lens blank.

According to the invention, the lens supply system thus further comprises:

processing means (PM3) at a lens manufacturing side (LMS) suitable for providing lens manufacturing data (LMD) based upon lens data (LD) and the measured value of the geometrical parameter of said lens blank, and comprising outputting means (OM3) suitable for outputting the lens manufacturing data (LMD); and lens data transmission means (TM2) suitable for transmitting said lens data (LD) from said processing means (PM2) at the lens determination side (LDS) to said processing means (PM3) at the lens manufacturing side.

Advantageously according to this embodiment, said lens manufacturing data comprise one or more of designation of the type of equipment to be used for machining, including designation of type of blocking machine, type of surfacing machine, type of polishing machine, etc.;

selection of settings and/or protocol parameters to be used by each of said machining equipment, for example protocols for blocking the lens, for surfacing the lens, for polishing the surfaced surface of the lens, etc.

Such supply system is very advantageous in that it allows to customize the manufacturing process of the finished lens in accordance with the actual measured values of the blank to be used. This results in a more accurate manufacturing method to be used, thus providing lenses with higher quality and improved wearer comfort.

The outputting means (OM1, OM2, OM3), either at the lens ordering side, the lens determining side or the lens manufacturing side, may be any means suitable outputting means for sending data from one processing means to another processing means. The transfer of data between processing means is performed by the transmission means. Said order data or lens data transmission means (TM1, TM2) may be any means suitable for performing such transfer. The person skilled in the art is familiar with suitable transmitting means useful in the field of lens supply systems. Suitable means include means for electronic communications, such as by internet connections, for example via one or more network connected to one or more servers or clouds, e-mail communication, and the like.

Said processing means (PM2, PM3), either at the lens determination side (LDS) or lens manufacturing side (LMS), may be a computer entity and may comprise a memory (MEM). The computer entities may be connected to each other through one or more servers. Said servers may comprise storing means in the form of a memory. Memories are known in the art and the skilled person is familiar with memories that that suitable for implementation within a lens supply system. The memory may be suitable for storing data, such as: input data, output data, intermediate data (such as intermediate computation results). The memory may be useful as a working memory and/or to store sequence of instructions. The memory may be provided in one or more storing elements/means, and may be part of a server and/or of a 'cloud' connected by a network.

Lens Blanks and Stocks of Blanks

The present invention also relates to a semi-finished spectacle lens blank that allows the subsequent retrieval of the measured value of at least one of its geometrical parameters.

The present invention provides a semi-finished spectacle lens blank having a manufacturing specification with nominal values for geometrical parameters, wherein said geometrical parameters include one or more selected from:

front or back or lenticular curve radius; front surface sag height; center or edge thickness; diameter; location of the polarization film within the semi-finished; and deviations thereof with respect to the corresponding nominal values from said manufacturing specification; and parameters indicating the location of a reference point selected from fitting cross (FC), layout reference point (LRP), prism reference point (PRP), distance reference point (DRP), near reference point (NRP); and deviations thereof with respect to the corresponding nominal values from said manufacturing specification;

wherein said lens blank is provided with an identifier allowing the subsequent retrieval of the measured value of at least one of said geometrical parameters as previously obtained by physical measurement. Said identifier is preferably a graphic identifier.

The identifier may also allow retrieval of both:

the measured value of said at least one of said geometrical parameters as previously obtained by physical measurement; and the nominal values of said at least one of said geometrical parameters of the manufacturing specification, or the deviation of the measured value therefrom;

to be subsequently retrieved.

Alternatively, two different identifiers may be used, one that allows the measured value of said at least one of said geometrical parameters as previously obtained by physical measurement to be retrieved and the other one that allows the nominal values of said at least one of said geometrical parameters of the manufacturing specification, or the deviation of the measured value therefrom to be retrieved.

In one aspect, said identifier further allows the subsequent retrieval of one or more non-geometrical parameter(s) of the manufacturing specification.

In another aspect, said identifier contains coded or encrypted data. Said identifier may take a form selected from bar codes, including 1D codes, 2D codes (Datamatrix, QR codes, Flashcodes, Aztec, etc.), 3D codes, etc; wireless codes such as RFID or NFC; encryption keys.

Said identifier may take a graphic form and may be provided either on the lens blank surface or within the lens blank bulk. This may be obtained by means known in the art, such as stamping, printing, engraving, for example by use of a Femto laser, as described in EP13305240.7 filed on 1 Mar. 2013.

In the event where the lens blank is provided in a packaging, said identifier may be provided on said packaging, by means also known in the art, such as by using a label, a stamp, or by print (inkjet, etc.).

The invention also relates to a pool of blanks, consisting of a plurality of semi-finished spectacle lens blanks according to the invention.

Methods for Providing a Blank

The invention also relates to a method for providing a semi-finished lens blank of the invention, namely for providing a semi-finished lens blank that allows the subsequent retrieval of the measured value of at least one of its geometrical parameters. This method makes use of an identifier as described herein.

Advantageously according the invention, the semi-finished lens blank is identifiable in an individual fashion.

The invention thus provides a method for providing a semi-finished spectacle lens blank, comprising the steps of:
(a) providing a semi-finished spectacle lens blank having a manufacturing specification with nominal values for geometrical parameters;
(b) performing a physical measurement of at least one geometrical parameter of said lens, so as to obtain a measured value for said at least one geometrical parameter;
(c) providing said semi-finished spectacle lens blank with an identifier that allows to retrieve said measured value.

Step (a) may be performed by all types of supply such as manufacturing, importing, or purchasing said blank.

Step (b) may be performed in the framework of quality control.

Step (c) may comprise comprises the steps of:
(c1) providing a packaging for said lens blank; and
(c2) providing said identifier on said packaging.

The identifier is as described above.

Advantageously according to the invention, step (b) may be performed with respect to a plurality of geometrical parameters. In such case, the blank may be provided with either a unique identifier or a plurality of identifiers (e.g. one identifier per value measured). Advantageously, said unique identifier allows the retrieval of the measured value of a plurality of geometrical parameters. This allows improved picking options.

Thus, the identifier of step (c) allows to retrieve the measured values for said plurality of geometrical parameters.

It is also proposed that the lens blank is provided with two identifiers: one identifier that allows the subsequent retrieval of the measured value of at least one of its geometrical parameters, and one identifier that allows the subsequent retrieval of the value of one or more non-geometrical parameter of the manufacturing specification. If two identifiers are provided, they may be both on the blank; or both inside the blank; or both on the packaging if any; or one on the blank and one inside the blank; or one on the blank and one on the packaging; or one inside the blank and one on the packaging. All possible combinations are envisioned.

Methods for Picking a Blank

The invention also relates to methods for picking a blank according to a desired value of a geometrical parameter thereof. Such methods make use of identifiers as described above.

The invention provides a computer-implemented method for selecting a semi-finished spectacle lens blank according to a desired value of a geometrical parameter thereof, from a plurality of semi-finished spectacle lens blanks, comprising the steps of:
(1) selecting a geometrical parameter;
(2) selecting a desired value for said geometrical parameter;
(3) providing a plurality of semi-finished spectacle lens blanks, wherein each of said lens blanks is provided with an identifier allowing the retrieval of the respective measured value of said geometrical parameter as previously obtained by respective physical measurement;
(4) retrieving, via the identifiers of step (3), the measured value of said geometrical parameter for each of the lens blanks of said plurality of lens blanks; and
(5) selecting a lens blank from said plurality of lens blanks by comparing the values obtained at step (4) and the desired value of step (2).

Advantageously according to the invention, the selection (picking) may be performed with respect to a plurality of geometrical parameters and respective desired values thereof. The method of the invention may in this case make use of priority ranks (weight) for emphasizing certain geometrical parameters over others.

Further, the selection of step (5) may also be a selection, not only based upon the measure value of at least one of geometrical parameter, but also in addition based upon the value of one or more non-geometrical parameter(s) of the manufacturing specification. This can be advantageously achieved by means of a unique identifier per blank, wherein the identifier further allows to retrieve non-geometrical parameters from the manufacturing specification of the blank.

The invention also relates to a computer-implemented method for managing a stock of semi-finished spectacle lens blanks, comprising a method for selecting a semi-finished spectacle lens blank as described herein. This results in improved tools for managing supplies (pools) of semi-finished lens blanks.

Method for Providing Lens Manufacturing Data for an Ophthalmic Lens

The invention also relates to a method for providing lens manufacturing data for an ophthalmic lens as described herein.

This method comprises the steps of:
receiving at a lens determination side (LDS) order data (OD) of an ophthalmic lens from a lens ordering side (LOS)
selecting a semi-finished spectacle lens blank from a plurality of semi-finished spectacle lens blanks, wherein each semi-finished spectacle lens blank of said plurality is provided with
a manufacturing specification with nominal value for a geometrical parameter,
a measured value for the geometrical parameter obtained from a physical measurement of the geometrical parameter, wherein said measured value is retrievable through an identifier;
providing lens manufacturing data (LIVID) based upon the measured value of the geometrical parameter of the selected lens blank.

The lens manufacturing data (LMD) are then used to manufacture the ophthalmic lens from the selected semi-finished lens blank. Thus, the ophthalmic lens is manufactured using the measured value for the geometrical parameter rather than the nominal value of the same geometrical parameter. Consequently, the optical properties of the manufactured ophthalmic lens are more accurate to the one desired.

Method for Making a Finished Lens

The invention relates to a method for making a finished lens. The method makes use of an identifier as described herein.

In one aspect, the invention provides a computer-implemented method for providing a finished ophthalmic spectacle lens, comprising the steps of:

(i) selecting a semi-finished spectacle lens blank in accordance with a method for selecting a semi-finished spectacle lens blank according to the picking method described herein;

(ii) determining a surface design for the back face of the lens; and (iii) machining the back face of said blank, so as to provide said finished lens.

Due to the increased efficiency at the picking stage, the manufacturing method of the invention also shows improved efficiency.

Further, advantageously to the invention, steps (ii) and (iii) may take into account measured value retrieved through the identifier, e.g. at the steps of designing the lens with respect to the target optical function, designing the desired back surface of the finished lens, and/or for setting the machining strategy and protocols as a function of actual measured value of geometrical parameter. This results in overall increased accuracy, which is required for the design and manufacture of complex back surfaces. This effectively results in improved wearer comfort, since the design and the manufacture of the lens reflect the actual measured value of a geometrical parameter rather than the nominal value from the specification.

In another aspect, the invention provides a computer-implemented method for providing a finished ophthalmic spectacle lens, comprising the steps of:

($\alpha$) selecting a lens blank from a plurality of semi-finished spectacle lens blanks according to selection method of the invention (picking);

($\beta$) determining a surface design for the back face of the lens;

($\gamma$) machining the back face of said blank, so as to provide said finished lens;

wherein step ($\beta$) or step ($\gamma$) takes into account the measured value of said geometrical parameter.

Further, advantageously to the invention, step ($\beta$) may take into account measured value retrieved through the identifier, e.g. at the steps of designing the lens with respect to the target optical function, and designing the desired back surface of the finished lens

Computer Program Products

The invention also relates to a (non-transitory) computer program product comprising one or more stored sequence(s) of instructions that is accessible to a processor and which, when executed by the processor, causes the processor to carry out the steps of any one of the methods of the invention as described herein.

The invention also provides a (non-transitory) computer readable medium carrying out one or more sequences of instructions of the computer program product according to the invention.

The invention also pertains to the use of an identifier (as described herein) for the retrieval of the measured value of one or more geometrical parameters of a semi-finished lens blank.

The invention is illustrated by the following non-limiting examples.

EXAMPLES

Example 1: Design and Manufacturing

A semi-finished lens blank (Essilor reference Physio 2, Orma (n=1.502), base 4.5, Add 1.5) has a nominal value for specification geometrical parameter Radius of 117.78 mm at the far vision reference point.

The actual measured value for this parameter is 118.01 mm.

This value is recorded on a dedicated server.

The blank is provided with an identifier in the form of a Datamatrix printed on the lens surface. The identifier allows to subsequently retrieve the measured value of 118.01 mm and hence to customize the design and manufacturing of the back surface of the lens with higher accuracy, resulting in improved wearer comfort.

Example 2: Picking

A semi-finished lens blank (Essilor reference Physio 2, Orma (n=1.502), base 4.5, Add 1.5) has a nominal value for specification geometrical parameter Radius of 117.78 mm at the far vision reference point. The corresponding mean sphere value at this point is 2.824 D.

The actual measured value for this parameter is 169.95 mm, which corresponds to a mean sphere value of 2.951 D. This results in a difference in mean sphere value of 0.13 D with respect to the nominal value from the specification. This semi-finished blank should normally be discarded in a common process, as the difference is greater than 0.12 D.

However, according to the invention, it is possible to consider that this deviation from the nominal value is not too high, and the actual measured value is recorded on a server. The blank is provided with an identifier in the form of a Datamatrix printed on the lens surface. The identifier allows to subsequently retrieve the measured value of 169.95 mm.

This semi-finished lens blank can be stored and picked up for the manufacturing of the desired lens through its identifier, since the manufacturing step may be performed by taking into account this deviation.

Moreover, when picking the semi-finished blank, it is also possible to perform the picking in accordance with the expiration date of the available blank candidates for picking, and thus select a candidate with the earliest expiration date. The stock management is thus improved.

Example 3: Design and Manufacturing

A semi-finished lens blank (Essilor reference Physio 2, base 4.5, Add 1.5) has a nominal value for the location of a reference point stamping mark with respect to micro-markings (Tx=0 mm, Ty=0 mm, Rz=0°.

(Tx, Ty, Rz) are as defined in WO 2013/087504.

The measured values are (Tx=0.3 mm, Ty=0.13 mm, Rz=1.12°.

These values are recorded on a dedicated server.

The blank is provided with an identifier in the form of a Datamatrix provided on the lens blank, which allows to subsequently retrieve the measured values (Tx=0.3 mm, Ty=0.13 mm, Rz=1.12°.

The retrieval of these values allows to customize the design and manufacturing of the back surface of the lens with higher accuracy, resulting in improved lens quality and hence wearer comfort, due to improved compliance with the desired design.

Example 4: Picking

A semi-finished lens blank has a nominal value for the location of a polarizing film relative to the front surface (0.8 mm and constant over the entire front surface). The actual measured value varies between 0.4 mm and 1.7 mm.

These measured values are recorded on a dedicated server.

The blank is provided with an identifier in the form of an RFID label on its packaging.

The blank may not be suitably picked for making a finished lens with 1.6 mm of thickness. Instead, the supply system identifies another blank through its RFID label, wherein said blank matches the requirement for a 1.6 mm thick finished lens.

The invention claimed is:

1. A computer-implemented method for selecting a semi-finished spectacle lens blank according to a desired value of a geometrical parameter thereof, from a plurality of semi-finished spectacle lens blanks, comprising the steps of
   (1) selecting a geometrical parameter, said geometrical parameter selected from the group consisting of:
      a front curve radius, a back curve radius, a lenticular curve radius, a front surface sag height, an absolute minimum value of the front surface sag height, a local minimum value of the front surface sag height, an absolute maximum value of the front surface sag height, a local maximum value of the front surface sag height, an absolute mean value of the front surface sag height, a local mean value of the front surface sag height, a center thickness, an edge thickness, a maximum diameter of the lens semi-finished spectacle blank, a diagonal diameter, a minimum vertical diameter, a minimum horizontal diameter, a location of a polarization film within the semi-finished spectacle lens blank, and an orientation of the polarization film within the semi-finished spectacle lens blank;
   (2) selecting a desired value for said geometrical parameter;
   (3) providing a plurality of semi-finished spectacle lens blanks, wherein each of said lens blanks has a manufacturing specification with nominal values for geometrical parameters and is provided with an identifier for retrieval of a respective measured value of said geometrical parameter previously obtained by physical measurement, said measured value of said geometrical parameter being a value obtained from measurement of the geometrical parameter physically carried out on the corresponding semi-finished lens blank;
   (4) retrieving, via the identifiers of said plurality of semi-finished spectacle lens blanks of step (3), the measured value of said geometrical parameter for each of the lens blanks of said plurality of lens blanks; and
   (5) selecting a lens blank from said plurality of lens blanks by comparing the measured values obtained at step (4) and the desired value of step (2).

2. The computer-implemented method for managing a stock of semi-finished spectacle lens blanks, comprising a method for selecting a semi-finished spectacle lens blank according to claim 1.

* * * * *